Jan. 5, 1971 G. HÖFGEN 3,553,590

ELECTRONIC GONIOMETER

Filed Nov. 19, 1968

3 Sheets-Sheet 1

INVENTOR

GÜNTER HÖFGEN

BY Charles L. Johnson Jr.

ATTORNEY

INVENTOR
GÜNTER HÖFGEN
BY Charles L. Johnson, Jr.
ATTORNEY

INVENTOR
GÜNTER HÖFGEN
BY Charles L. Johnson Jr.
ATTORNEY

United States Patent Office 3,553,590
Patented Jan. 5, 1971

3,553,590

ELECTRONIC GONIOMETER

Günter Höfgen, Kornwestheim, Germany, assignor to International Standard Electric Corporation, New York, N.Y., a corporation of Delaware Filed Nov. 19, 1968, Ser. No. 777,055
Claims priority, application Germany, Dec. 29, 1967, 1,591,628
Int. Cl. H03b 3/04
U.S. Cl. 328—24 8 Claims

ABSTRACT OF THE DISCLOSURE

In a high power electronic goniometer, a carrier frequency signal and a modulating signal are directly connected to a first low power balanced modulator and indirectly connected, via separate 90° phase shifters, to a second low power balanced modulator. The output signals of said modulators are added and subtracted in a hybrid ring and subsequently separately amplified. The amplified signals are recombined in a second hybrid ring, which has a 90° phase shifter in one of its output arms, to provide properly phased output signals. In another embodiment, a feedback arrangement is provided to maintain an amplitude modulated type relationship between the carrier frequency signal and the goniometer outputs.

BACKGROUND OF THE INVENTION

Field of the invention

The present invention relates to an electronic goniometer and in particular to one capable of providing stable, high power, output signals useful in VOR systems.

Description of the prior art

Electronic goniometers, in theory, are well known. In a typical arrangement, as shown in FIG. 1, a high frequency signal is connected to two balanced modulators which are supplied with in phase-quadrature modulating signals. However, this system does not provide stable, high power output signals for the reason that it is difficult to build stable, high power modulators.

SUMMARY OF THE INVENTION

It is an object of the present invention to provide an electronic goniometer capable of providing stable, high power, output signals and which dispenses with the need for high power modulators.

According to the invention an electronic goniometer comprises a first source providing a carrier frequency signal, a second source providing a modulation signal, a first modulating means coupled to said first and second sources for producing a first suppressed carrier double sideband signal, first phase shifting means, a second modulating means coupled via said phase shifting means to said first and second sources for providing a second suppressed carrier double sideband signal, a first and second amplifier, a first combining means coupled between the outputs of said first and second modulating means and said first and second amplifiers, for applying the sum and difference of said first and second double sideband signals to said first and second amplifiers respectively, and a second combining means, having a first and second output, coupled to said first and second amplifiers for providing the sum and difference of the signals at the outputs of said amplifiers to said first and second outputs respectively.

BRIEF DESCRIPTION OF THE DRAWINGS

The above mentioned and other objects of this invention will become apparent by reference to the following description in conjunction with the accompanying drawings in which.

DESCRIPTION OF THE PREFERRED EMBODIMENTS

According to the invention, in order to achieve the best construction of an electronic goniometer the modulating operations must be separated from the production of output power.

Bearing this in mind, it will be seen that semiconductor diodes are better suited for the construction of a constant-operating modulator than transistors, as they have substantially more constant properties when used as two-terminal networks without amplification. Diodes permit the construction of modulators on the basis of controlled resistances, provided one is prepared to do without the immediate output of the desired power and to operate at a low level and with relatively large losses.

Compared with other known modulators incorporating controllable reactances (e.g. varactor diodes) semiconductor diodes have, in the form of controllable real resistances in modulators, the advantage of good phase stability.

Figure 1:
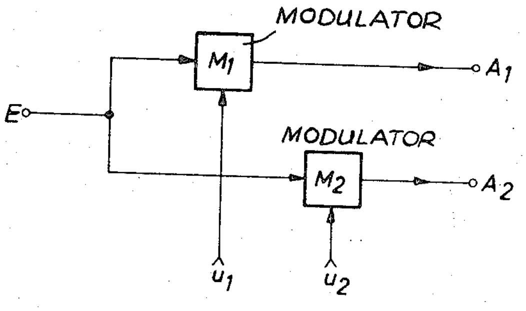
FIG. 1 is a schematic diagram illustrating a prior art electronic goniometer.
Figure 2:
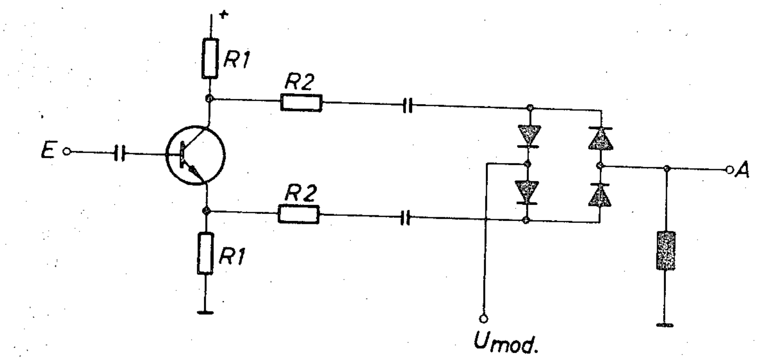
FIG. 2 is a schematic diagram of a balanced modulator.

According to the invention, the two modulators are constructed for example as a ring modulator with a series-connected phase splitter, as shown in FIG. 2. At an input level of about 600 $mv._{eff}$ the output level will be about 50 $mv._{eff}$. The linearity of such a modulator is excellent.

However, the above-mentioned task of separating the modulating operations from the production of power would not be accomplished simply by series-connecting appropriate power amplifiers to the outputs of the two modulators M1 and M2 constructed as shown in FIG. 2, since the instability and non-linearity of such amplifiers are comparable to the properties of a power modulator. The good properties of the modulators constructed according to FIG. 2 can be retained in the final output only when the electronic goniometer is constructed according to the invention, as shown in FIG. 3.

Figure 3:
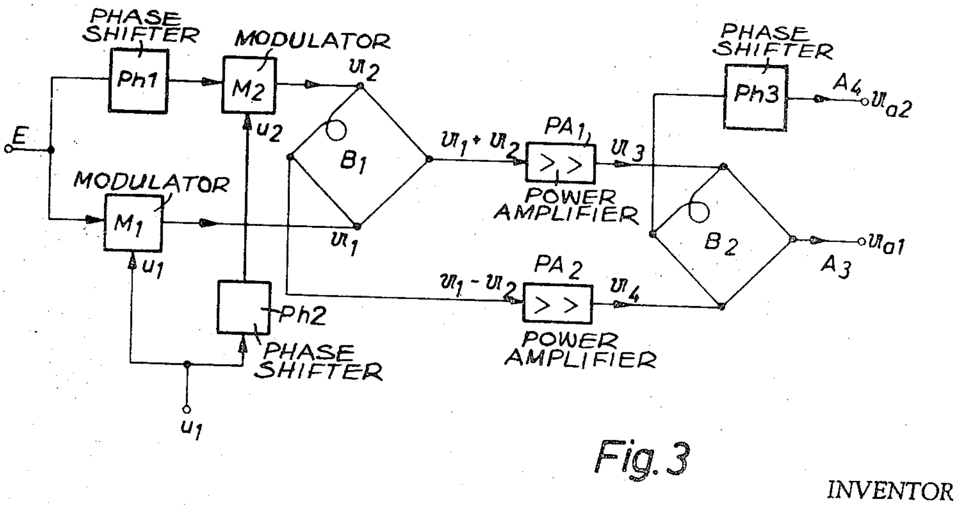
FIG. 3 is a schematic diagram illustrating an electronic goniometer.

In FIG. 3 the carrier input signal at E is fed in the usual manner to the modulator M1 direct and to the modulator M2 in phase quadrature, via phase shifter $P_{h1}$ which may be achieved, for example, by using an R.F. line whose length is $\lambda/4$ (where $\lambda$=average operating wavelength). The modulation signal $u1$ is fed to the modulator M1 direct and, after a phase shift of 90° in the phase shifter $P_{h2}$, to the modulator M2 as the modulation signal $u2$. The output signals of the modulators M1 and M2 are modulated oscillations $v_1$ and $v_2$ of a frequency corresponding to that of the sidebands with the carrier suppressed. These modulated signals $v_1$ and $v_2$ are converted to unmodulated signals of the frequency of the upper and lower sidebands by application thereof to diametrically opposite points of a hybrid ring B1 constructed, for example, of R.F. lines. Three of the arms of the bridge are of the length $\lambda/4$, while the fourth has a length of $3\lambda/4$. This hybrid may be replaced, if desired, by a 3 db directional coupler. In the bridge there are formed, as is well known, the sum $v_1+v_2$ and the difference $v_1-v_2$ of the input signals $v_1$ and $v_2$, so that at the remaining diametrically opposite points of the bridge the upper and lower sidebands are available as unmodulated carrier frequencies.

These two unmodulated sideband signals $v_1+v_2$ and $v_1-v_2$ are amplified to the required output power levels in two power amplifiers PA1 and PA2 which are connected in series to the outputs of the hybrid ring B1. Such power amplifiers are well known; they are of the class C type and have good limiter properties. Fluctuations in the input signal, even as great as 20%, are significantly reduced by said power amplifiers and constitutes a further contribution towards maintaining the output signals of the electronic goniometer constant.

The output signals $v_3$ and $v_4$ from the amplifiers PA1 and PA2 are converted to signals of the same form as those delivered by the modulators M1 and M2, this conversion being effected by a second hybrid ring B2 of the same configuration and function as the hybrid ring B1, one of the outputs of the hybrid B2 being connected to an appropriate phase shifter, such as an R.F. line having an electrical length of $\lambda/4$ (where $\lambda$=the average operating wavelength) for the necessary phase shift of 90°. The signals available at the outputs A3 and A4 correspond to the modulation sidebands of the carrier at a modulation frequency $f$ (e.g. 30 c./s.).

According to a further feature of the invention phase-regulating means are provided for the carrier oscillation to enable the electronic goniometer to be used in a VOR rotating radio beacon, which phase regulating means insure that the phase angle of the carrier oscillation is always equal to the arithmetic mean of the phase angles of the two sideband oscillations. Such phase regulation is required wherever the carrier and sidebands of a resultant modulated signal are produced and radiated separately, as in a VOR rotating radio beacon.

Figure 4:
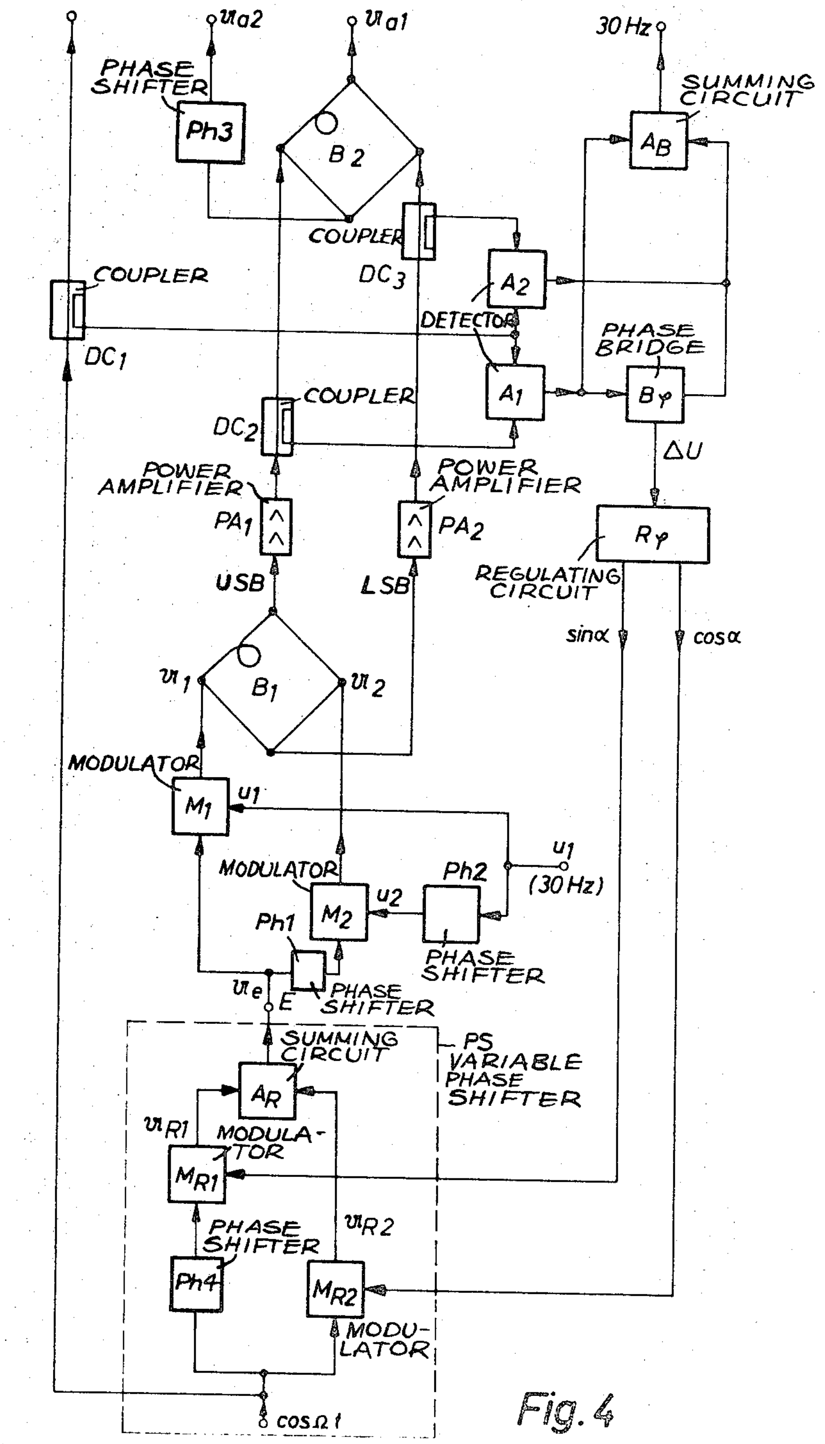
FIG. 4 is a schematic diagram of an electronic goniometer incorporating phase regulation.

The construction of the goniometer incorporating phase-regulating means for the carrier is shown in FIG. 4. This circuit includes the circuit of the electronic goniometer shown in FIG. 3 varied by the inclusion of decoupling elements DC1, DC2 and DC3 in the R.F. line leading to the carrier antenna and in the leads from the amplifiers PA1 and PA2 to the hybrid B2 for the purpose of comparing the phase of the carrier and the phases of the sidebands. The carrier signal decoupled by the decoupling element DC1 is fed to two detectors A1 and A2, while the signal of the upper sideband, decoupled by the decoupling element DC2, is fed to the detector A1 and the signal of the lower sideband decoupled by the decoupling element DC3, is fed to the detector A2. The detectors A1 and A2 comprise summing circuits combined with a peak rectifier. The respective signals are added in said units and then linearly demodulated in the peak rectifiers.

The time functions for the decoupled signals of the carrier and upper and lower sidebands may be expressed as follows:

$$f_{Tr}(t)=\cos(\Omega t+\varphi_0)$$

$$f_{VSB}(t)=\cos[(\Omega+\omega)t+\varphi_1]$$

and $$f_{LSB}(t)=\cos[(\Omega-\omega)t+\varphi_2] \text{ respectively}$$

wherein $\Omega$ is the radian frequency of the carrier, $\omega$ is the radian frequency of the modulation (e.g. 30 c./s.) and $\varphi_0$, $\varphi_1$ and $\varphi_2$ are the phases respectively of the carrier and upper and lower sidebands.

In the detector A1 there is formed the sum of the carrier and upper sideband. After demodulation there appears at the output of the detector A1 a signal of the frequency of the modulation (e.g. 30 c./s.) and with the time function:

$$g_1(t)=\cos(\omega t+\varphi_1-\varphi_0)$$

Similarly, after summation of the carrier and the lower sideband and subsequent demodulation, there appears at the output of the detector A2 a signal with the time function:

$$g_2(t)=\cos(\omega t+\varphi_0-\varphi_2)$$

As can be seen from the equations, the two demodulation products (e.g. 30 c./s. signals) include the phase angle of the high frequency signals. Said signals are connected to a phase bridge $B\varphi$, in which the sum and difference voltages are formed and then rectified. The values of the rectified voltages are equal when the two A.C. signals (30 c./s. signals) are in phase quadrature. The phase difference appears at the output of the phase bridge as a D.C. voltage $\Delta U$, which, in the case of a phase difference of 90° between the two input A.C. signals, is equal to zero. When slight deviations of the actual phase difference from the desired phase difference of 90° occur, the output D.C. voltage $\Delta U$ will be proportional to said deviations.

Figure 5:
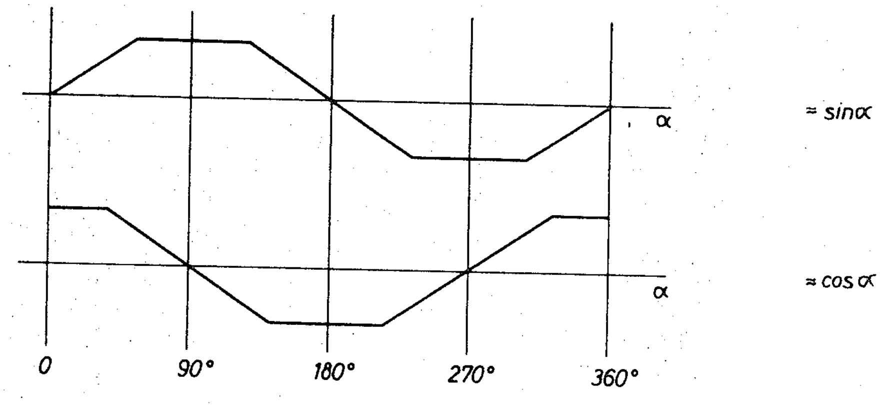
FIG. 5 is a set of waveforms which represent signals present in the electronic goniometer.
Figure 6:
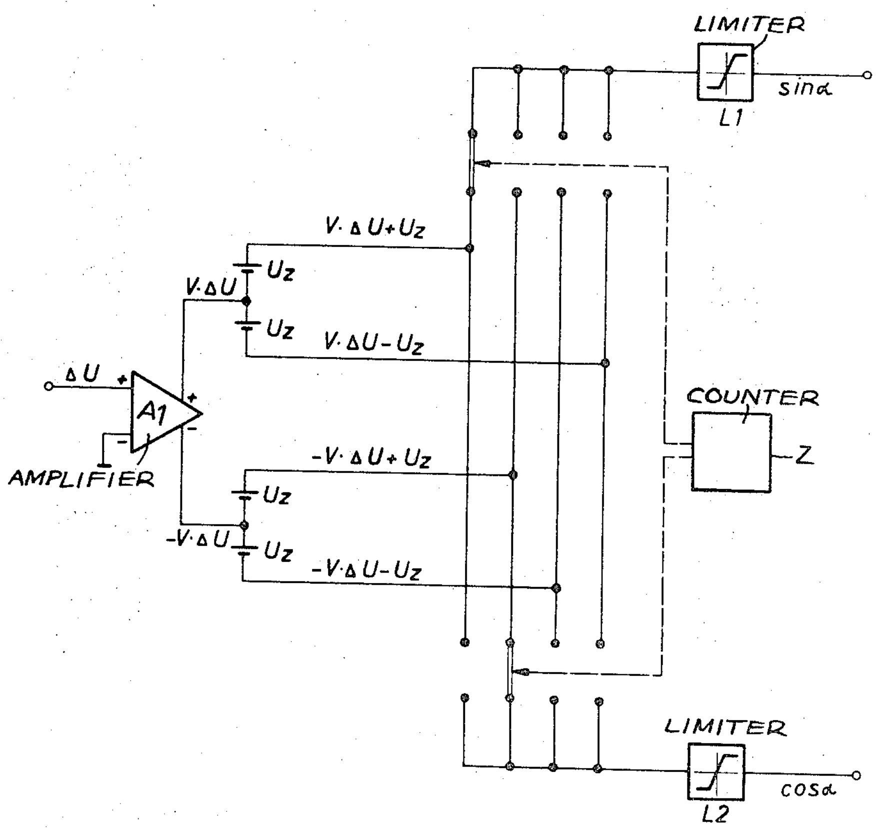
FIG. 6 is a schematic diagram of a feedback network according to the invention.

Between the phase bridge $B\varphi$ and the variable phase shifter PS indicated by the dotted rectangle and connected in series with the goniometer arrangement shown in FIG. 3 there is inserted a regulating circuit $R\varphi$ for the production of a regulating voltage. This circuit arrangement is shown in FIG. 6. Its purpose is to convert the output voltage $\Delta U$ from the phase bridge $B\varphi$ to values suitable for subsequent phase control and to match them to the inputs of the variable phase shifter PS. Said phase shifting unit PS requires two input voltages which bear a relationship to each other as a sine function does to a cosine function. Such voltages are approximately generated (trapezoid) in the circuit arrangement $R\varphi$ and are illustrated qualitatively in FIG. 5. The outputs of the circuit arrangement $R\varphi$ are produced from the input voltage $\Delta U$ by amplifying, potentially displacing, phase reversing and limiting $\Delta U$. Whether potential displacement and/or phase reversal are necessary or not depends on the quadrants in which the output values lie. Each of the four quadrants is associated with a logical element having the properties "phase reversal" or "potential displacement." Transfer from one quadrant to the next is effected in a known manner by means of a forward/backward-action counter Z (FIG. 6). Thus the output signals may correspond to any desired angle of the sine or cosine function.

The variable phase shifter PS (FIG. 4) for the carrier ($\cos\Omega t$) consists of two modulators $M_{R1}$ and $M_{R2}$, a 90° phase shifter, such as an R.F. line having a length of $\lambda/4$, which is connected in series to the modulator $M_{R1}$, and a summing circuit $A_R$. The modulators $M_{R1}$ and $M_{R2}$ are adapted to provide suppression of the carrier at their outputs. The outputs of the circuit arrangement $R\varphi$, are applied to the modulators $M_{R1}$ and $M_{R2}$. Their output voltages may be expressed (approximately) as:

$$v_{R1}=v_0\sin\alpha\sin\Omega t$$

and $$v_{R2}=v_0\cos\alpha\cos\Omega t \text{ respectively}$$

Addition in the summing circuit $A_R$ makes the ouput voltage for the entire variable phase shifter PS a value which may be expressed as follows:

$$v_e=v_0\cos(\Omega t-\alpha)$$

It may be seen, therefore, that this voltage is phase displaced by the angle $\alpha$ compared with the input voltage $\cos\Omega t$ of the carrier. Thus, this phase displacement is identical to the angle $\alpha$ contained in the outputs ($\sin\alpha$, $\cos\alpha$) of the circuit arrangement $R\varphi$.

The mode of operation of the entire phase regulating means is as follows:

In the balanced state, which is necessary for perfect operation of the electronic goniometer for a VOR system because of the combination which is required to form pure amplitude modulation in the field, the phase of the carrier must always be the arithmetic mean of the phases of the sidebands. That means, however, nothing other than that the output voltages of the detector circuits A1 and A2, namely $\cos(\omega t+\varphi_1-\varphi_0)$ and $\cos(\omega t+\varphi_0-\varphi_2)$ respectively, must be of equal phase to produce the balanced state. However, to produce the balanced state of the phase bridge $B\varphi$, namely $\Delta U=0$, a 90° phase shift of its input signals is necessary. This may be produced either by a corresponding phase displacement of the low-frequency output voltages of the detector circuits A1 or A2 or by the inclusion thereof in the high frequency voltage. This latter, more convenient possibility may be simply realized by placing one of the decoupling elements of the sidebands, e.g. DC2, at a point in the R.F. line which is displaced from the other (DC3) by a quarter wavelength.

Thus, the balanced state for the phase bridge $$B\varphi(\Delta U=0,)$$

for the circuit arrangement $R\varphi$ and for the angle of its outputs (sin $\alpha$, cos $\alpha$) is defined by the following equation:

$$\varphi_0=\frac{\varphi^1+\varphi^2\pm 90^\circ}{2}$$

If this equation is not satisfied, the phase bridge $B\varphi$ will provide an output voltage $\Delta U$, which will have a regulating effect on the variable phase shifter PS via the circuit arrangement $R\varphi$ (angle $\alpha$) and the phase deviation of the carrier will be cancelled out with the exception of an insignificant residual error. Within one quadrant (+45°) the regulation has a proportional character, while it is integrating when viewed from quadrant to quadrant (proportional-integral regulation).

The solution described above for achieving regulation has the special advantage of an endless, closed regulating range including all angles from 0° to 360°.

To determine the azimuth at the receiving end by evaluating the amplitude modulation of direction-dependent phase position, in VOR rotating radio beacons, it is, of course, necessary to radiate a direction-independent reference signal (in the VOR system it is 30 c./s.). In the known VOR system this is transmitted as a frequency modulation of a sub-carrier (9960 c./s.) via the same carrier.

In the present electronic goniometer it is not convenient, however, to use as a modulation voltage for the sub-carrier the voltage (30 c./s.) fed at *u*1 to the modulators M1 and M2, as its phase position in relation to the modulation voltages of the sidebands appearing at the goniometer output (outputs *va*1 and *va*2) is not rigidly held due to the regulation which takes place. For this reason, as a further feature of the invention, the reference signal used is the sum of the two A.C. voltages appearing at the output of the detection circuits A1 and A2 of the goniometer arrangement of FIG. 4. They are fed to a summing device $A_B$ at the output of which the phase-locked reference signal (30 c./s.) is available and by means of which the sub-carrier may be modulated and radiated.

I claim:

1. An electronic goniometer comprising:
a first source providing a carrier frequency signal;
a second source providing a modulation signal;
a first modulating means coupled to said first and second sources for producing a first suppressed carrier double sideband signal;
first phase shifting means;
a second modulating means coupled via said phase shifting means to said first and second sources for providing a second suppressed carrier double sideband signal;
a first and second amplifier;
a first combining means coupled between the outputs of said first and second modulating means and said first and second amplifiers, for applying the sum and difference of said first and second double sideband signals to said first and second amplifiers respectively; and
a second combining means, having a first and second output, coupled to said first and second amplifiers for providing the sum and difference of the signals at the outputs of said amplifiers to said first and second outputs respectively.

2. An electronic goniometer, according to claim 1, further including a second phase shifter coupled to one of the outputs of said second combining means.

3. An electronic goniometer, according to claim 2, wherein said first and second modulating means include a first and second balanced modulator respectively.

4. An electronic goniometer, according to claim 2, wherein said first and second combining means includes a first and second hybrid rings respectively.

5. An electronic goniometer, according to claim 2, wherein said first source comprises a carrier frequency signal generator, a variable phase shifter coupled to said carrier frequency signal generator and means for regulating the phase shift of said variable phase shifter.

6. An electronic goniometer, according to claim 5, wherein said means for regulating said variable phase shifter comprises first means for sampling said carrier frequency signal generator, second means for sampling the output of said first amplifier, third means for sampling the output of said second amplifier, means for combining the outputs of said first, second, and third sampling means to provide an error signal and a reference signal, and means coupling said combining means to said variable phase shifter.

7. An electronic goniometer, according to claim 5, wherein said variable phase shifter includes, a third phase shifter coupled to said carrier frequency signal generator, a summing circuit, a third modulator coupling said third phase shifter to said summing circuit, and a fourth modulator coupling said carrier frequency generator means to said summing circuit.

8. An electronic goniometer, according to claim 6, wherein said combining means include a first detector, a second detector, a phase bridge coupled to said first and second detectors to provide an error signal, and a summing circuit coupled to said first and second detectors to provide a reference signal.

References Cited

UNITED STATES PATENTS 3,029,396 4/1962 Sichak ............ 332—44X

ROY LAKE, Primary Examiner

J. B. MULLINS, Assistant Examiner

U.S. Cl. X.R.

307—295; 328—155; 332—44